United States Patent [19]
Leach et al.

[11] Patent Number: 5,657,200
[45] Date of Patent: Aug. 12, 1997

[54] TUBULAR BUS ARRANGEMENT FOR POWER TRANSPORT IN ELECTRICAL DEVICES

[75] Inventors: Thomas Carver Leach; James Paul Mills, Jr.; Robert James Cooper. all of Lexington, Ky.

[73] Assignee: Square D Company, Palatine, Ill.

[21] Appl. No.: 583,834

[22] Filed: Jan. 11, 1996

[51] Int. Cl.$^6$ ............................................. H02B 1/00
[52] U.S. Cl. .................................. 361/668; 324/156
[58] Field of Search ........................ 174/68.2, 72 B, 174/71 B, 88 B, 99 B; 324/110, 156; 361/624, 637–640, 648–650, 668–671; 439/146, 167, 212, 508, 517, 723

[56] References Cited

U.S. PATENT DOCUMENTS

| | | | |
|---|---|---|---|
| 2,231,677 | 2/1941 | Mylius | 361/670 |
| 2,592,299 | 4/1952 | Lewis | 361/670 |
| 3,458,768 | 7/1969 | Schubert | 361/641 |
| 3,707,652 | 12/1972 | Coffey et al. | 317/120 |
| 3,707,653 | 12/1972 | Coffey et al. | 317/120 |
| 3,783,343 | 1/1974 | Byland | 317/107 |
| 3,858,091 | 12/1974 | Wilkinson | 317/120 |
| 3,906,295 | 9/1975 | Tessmer | 317/107 |
| 3,949,277 | 4/1976 | Yosset | 317/120 |
| 4,443,654 | 4/1984 | Flachbarth et al. | 174/78 |
| 4,532,574 | 7/1985 | Reiner et al. | 361/365 |
| 4,623,859 | 11/1986 | Erickson et al. | 335/14 |
| 4,796,844 | 1/1989 | Barker | 248/222.2 |
| 4,920,476 | 4/1990 | Brodsky et al. | 364/140 |
| 5,180,051 | 1/1993 | Cook et al. | 200/400 |
| 5,301,083 | 4/1994 | Grass et al. | 361/64 |
| 5,404,266 | 4/1995 | Orchard et al. | 361/667 |
| 5,418,683 | 5/1995 | Orchard et al. | 361/672 |

FOREIGN PATENT DOCUMENTS

| | | | |
|---|---|---|---|
| 2595512 | 9/1987 | France | 361/668 |

*Primary Examiner*—Gregory D. Thompson
*Attorney, Agent, or Firm*—Larry I. Golden; Kareem M. Irfan

[57] ABSTRACT

The present invention provides a meter socket arrangement wherein a tubular bus is coupled between each planar bus bar connected to the power source and meter input terminals for transporting electrical power from the planar bus bars to their respective meter input terminals. This invention also provides a novel boot for connection between the tubular bus and the planar bus bar to provide improved electrical connection between the bus bar and the tubular bus. The present invention may be utilized in any meter socket arrangement, including meter socket arrangements used in combination service entrance devices.

19 Claims, 6 Drawing Sheets

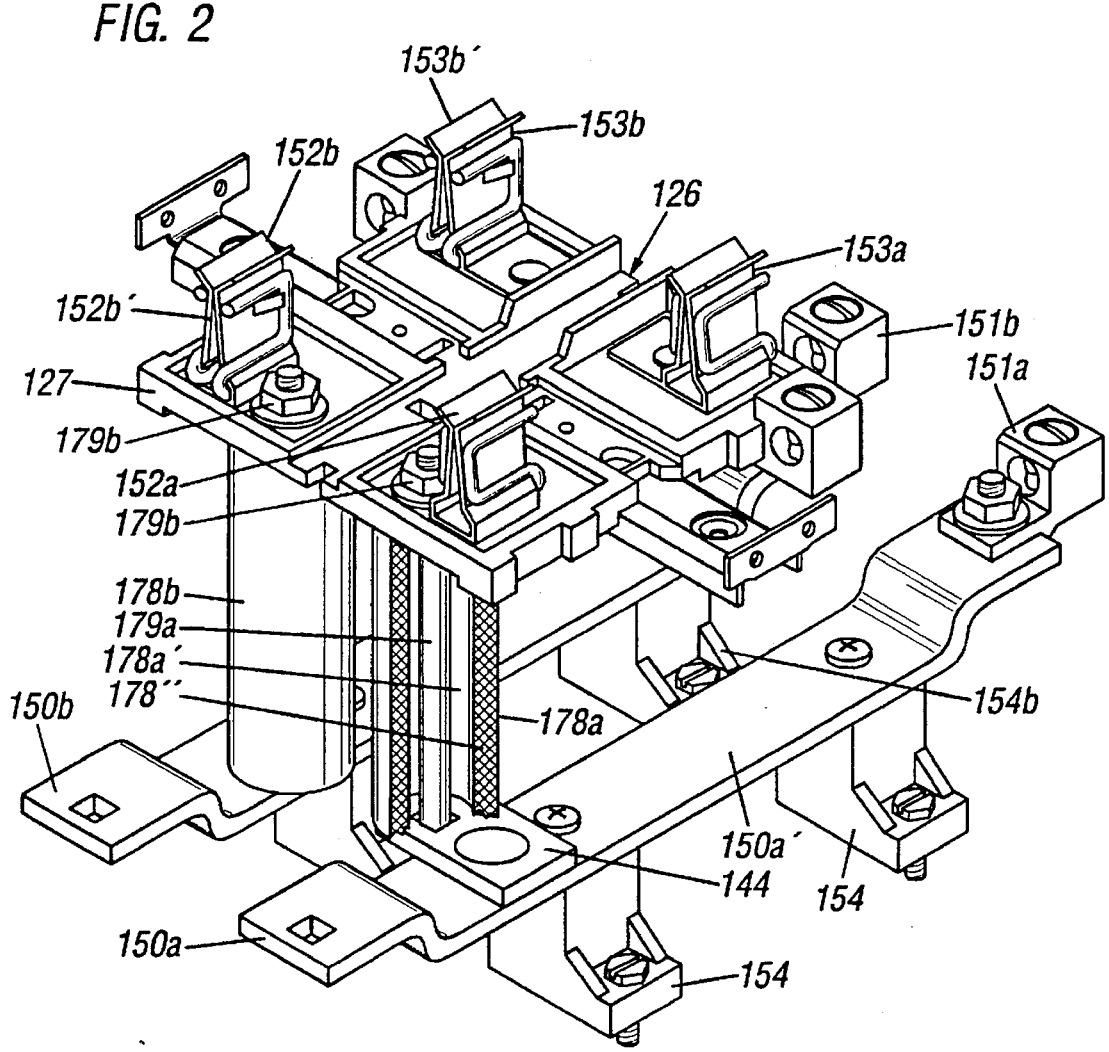

TUBULAR BUS ARRANGEMENT FOR POWER TRANSPORT IN ELECTRICAL DEVICES

BACKGROUND OF THE INVENTION

1. Field of the Invention

This invention relates generally to electrical power distribution apparatus and more particularly to a tubular bus arrangement for transporting electrical power from a rectangular bus bar to another element, such as a meter socket jaw, and a novel means for connecting the rectangular bus bar to the tubular bus.

2. Description of the Related Art

Devices such as combination service entrance devices, panel boards, busway bus ploughs, dead front switch boards, and other electrical enclosures use bus bars of rectangular cross-sections (bus bars) for carrying electrical power. Typically, such bus bars are suitably bent at desired angles, within permissible tolerances, for connection to other electrical nodes in the device, subsystem or system.

Bus bars with required tolerances in angle of bending and required lengths are difficult to manufacture and are relatively expensive. Also, in certain applications where power is transported at higher electrical frequencies, bus bars make inefficient use of the conductor material because current density distribution is highest around the outer surface of the conductor. Additionally, in short circuit conditions extremely high short circuit currents flow through bus bars, subjecting the conductors to magnetic forces which are proportional to the square of the current. Because the magnetic forces appear within a very short period of time, the resulting forces act as impact forces on the conductors. A rectangular conductor is inherently weaker in one direction than the other direction and therefore requires additional support in the weaker direction to withstand impact forces.

The present invention addresses the above-noted deficiencies of the prior art of using bus bar connection for power transport in listed devices, including combination service entrance units. The present invention also provides a novel means for connecting the tubular bus to a straight section of the bus bar to improve current-carrying characteristics. The system of the present invention has superior current-carrying characteristics compared to the system of using bus bars for routing power in a device.

SUMMARY OF THE INVENTION

The present invention provides a tubular bus arrangement for transporting power from a source to another element, such as the utility meter socket jaws. The tubular bus arrangement of the present invention contains a rectangular bus bar for receiving electrical power from a source, a meter socket jaw and a tubular bus coupled between the bus bar and the meter socket jaw for transporting electrical power from the bus bar to the meter socket jaw. A novel contact boot is provided that may be placed between tubular bus and a substantially planar surface of the bus bar for improving current carrying characteristics. The boot preferably contains a cylindrical body for receiving therein the tubular bus. A plurality of fins extending away from the cylindrical body at an angle is provided so that when the tubular bus is secured between the bus bar and the meter socket jaw, the cylindrical body is urged against the tubular bus to provide increased surface contact area between the tubular bus and the bus bar.

The tubular bus arrangement of the present invention may be utilized in meter sockets used alone or in devices such as combination service entrance devices, which typically contain a common enclosure divided by a center barrier into a first section for housing a watt-hour meter socket into and a second section for housing a panel board containing a plurality of circuit breakers and one or more service disconnects. The meter socket arrangements already in use may be readily modified by replacing the bent bus bars which connect the bus bars connected the source and the meter socket jaws with the tubular bus of the present invention.

Examples of the more important features of the invention thus have been summarized rather broadly in order that detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment taken in conjunction with the accompanying drawings, in which like elements have been given like numerals and wherein:

FIG. 2 shows a partial isometric view of a watt-hour meter socket with the tubular bus placed between the source bus bar and the meter socket jaw according to the present invention.

FIG. 3b shows the cross-section of the tubular bus taken along 170—170 as shown in FIG. 3a.

FIG. 4b shows the top view of the contact boot shown in FIG. 4a.

FIG. 5b shows a side view of the tubular bus connection to a straight section of the bus bar with the contact boot in the engaged position corresponding to FIG. 5a.

DESCRIPTION OF THE PREFERRED EMBODIMENTS

The present invention discloses a meter socket arrangement for efficiently transporting electrical power from a source to the utility meter. For clarity and ease of understanding, a typical prior art meter socket arrangement is first described by way of its use in a combination service entrance device followed by a description of the meter socket arrangements according to the present invention and the use of one such arrangement in a combination service entrance device.

Figure 1:
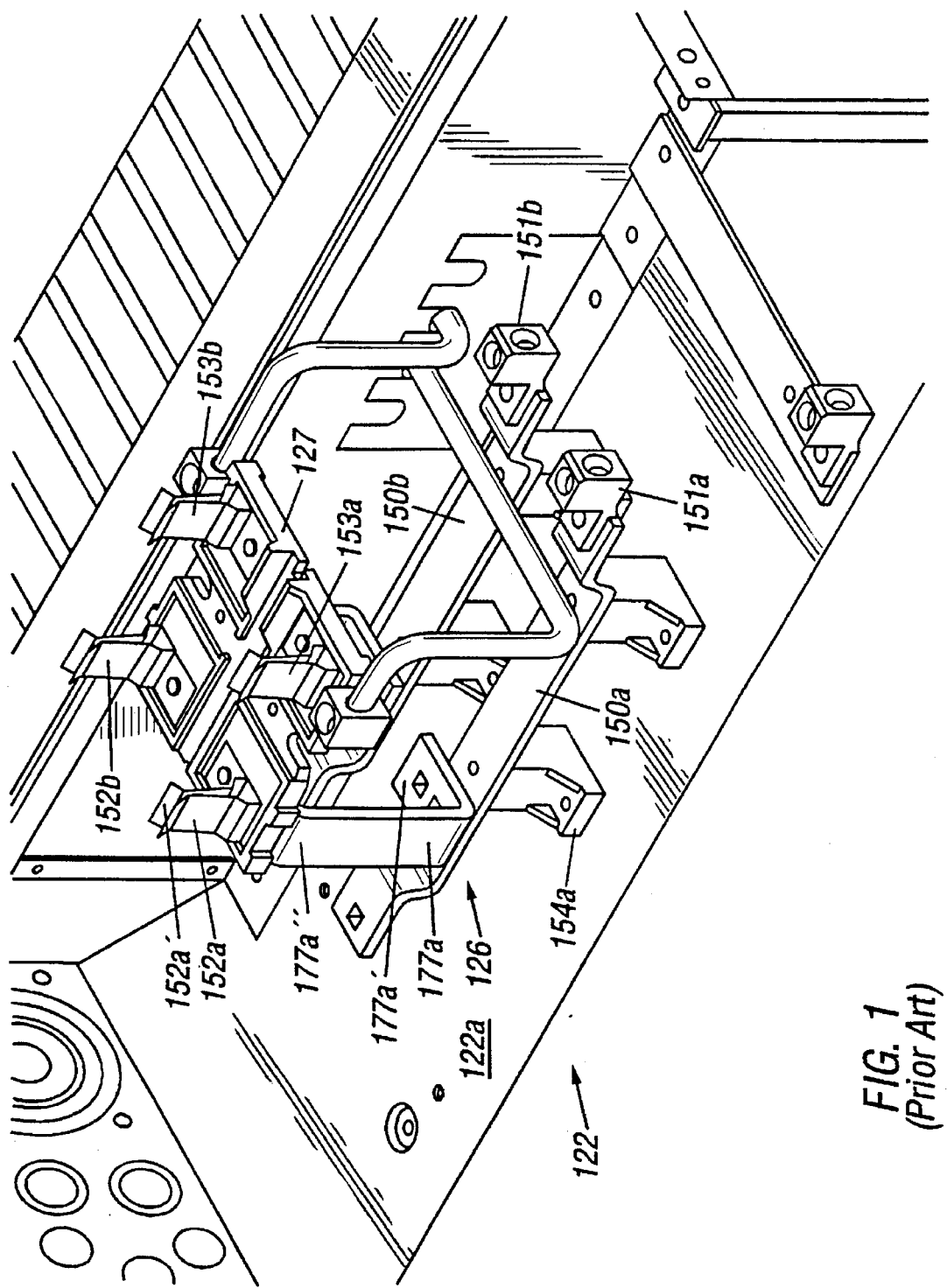
FIG. 1 shows a partial isometric view of the utility side of the combination service entrance device according to the prior art use of a bent bus bar.

A typical combination service entrance device contains a unitary box-like common enclosure, wherein a solid center barrier divides the common enclosure into a utility compartment for housing therein a watt-hour-meter socket arrangement and a customer compartment. The utility lines are brought into the utility compartment and appropriately connected to bus bars for power distribution through the watt-hour meter. The customer compartment houses one or more service disconnects and a plurality of circuit breakers. FIG. 1 shows a partial isometric view of the utility compartment or section 122 of a combination service entrance device having a meter socket arrangement which utilizes rectangular cross section bent bus bars according to the prior art. FIG. 1 is shown to contain a utility section 122 having a watt-hour meter socket 126 which contains a pair of spaced bus bars 150a and 150b respectively placed on their corresponding nonconductive meter socket bases 154a and 154b which are attached to a back panel 122a of the utility section 122. The bus bar 150a is coupled to an input jaw assembly 152a having a meter socket jaw 152a' by means of a bus bar 177a that is bent at the connecting ends 177a' and 177a". Bus bar 150b is similarly coupled to an input jaw assembly 152b by means of a bus bar (not shown) that is suitably bent at its connecting ends.

A separate output jaw assembly corresponding to each input jaw assembly is provided for distributing power to the various circuit breakers and service disconnects in the system. Output jaw assemblies 153a and 153b respectively correspond to the input jaw assemblies 152a and 152b. The input jaw assemblies 152a and 152b and the output jaw assemblies 153a and 153b are securely placed in appropriately cut openings in a nonconductive base 127. The utility lines (not shown) are coupled to the bus bars 150a and 150b at lugs 151a and 151b respectively for providing main power to the bus bars. Input terminals of a utility meter (not shown) are securely placed in the input jaw assemblies 152a and 152b, while the output terminals of the utility meter are placed in the output jaw assemblies 153a and 153b. Electrical power from the output jaw assemblies is routed to the various service disconnects in the system for supplying power to the desired loads. In this manner any power consumed by the user is recorded by the utility meter.

FIG. 2 shows a partial isometric view of an embodiment of a meter socket arrangement utilizing tubular buses for transporting electrical power according to the present invention. For clarity, the same reference numerals are used throughout this disclosure for the same elements. In the present invention, a tubular bus 178a having a through bore 178a' is connected between a planar surface 150a' of the bus bar 150a and the input jaw assembly 152a for transporting electrical power from the bus bar 150a to the input jaw assembly 152a. The tubular bus thickness 178" depends upon the desired current carrying capacity therethrough. The tubular bus 178a may be placed directly on the planar surface 150' or another planar member 144 coupled to the bus bar 150a. The tubular bus 178a is preferably secured to the bus bar 150a and the input jaw assembly 152a by a suitable bolt 179a axially placed through the tubular bus 179a and connected to a nut 179b. However, any suitable means in addition to bolts may be utilized to electrically couple the tubular bus to the bus bar and the meter socket jaw assembly. Bus bar 150b is similarly coupled to the input jaw assembly 152b by means of a tubular bus 178b.

Figure 3A:
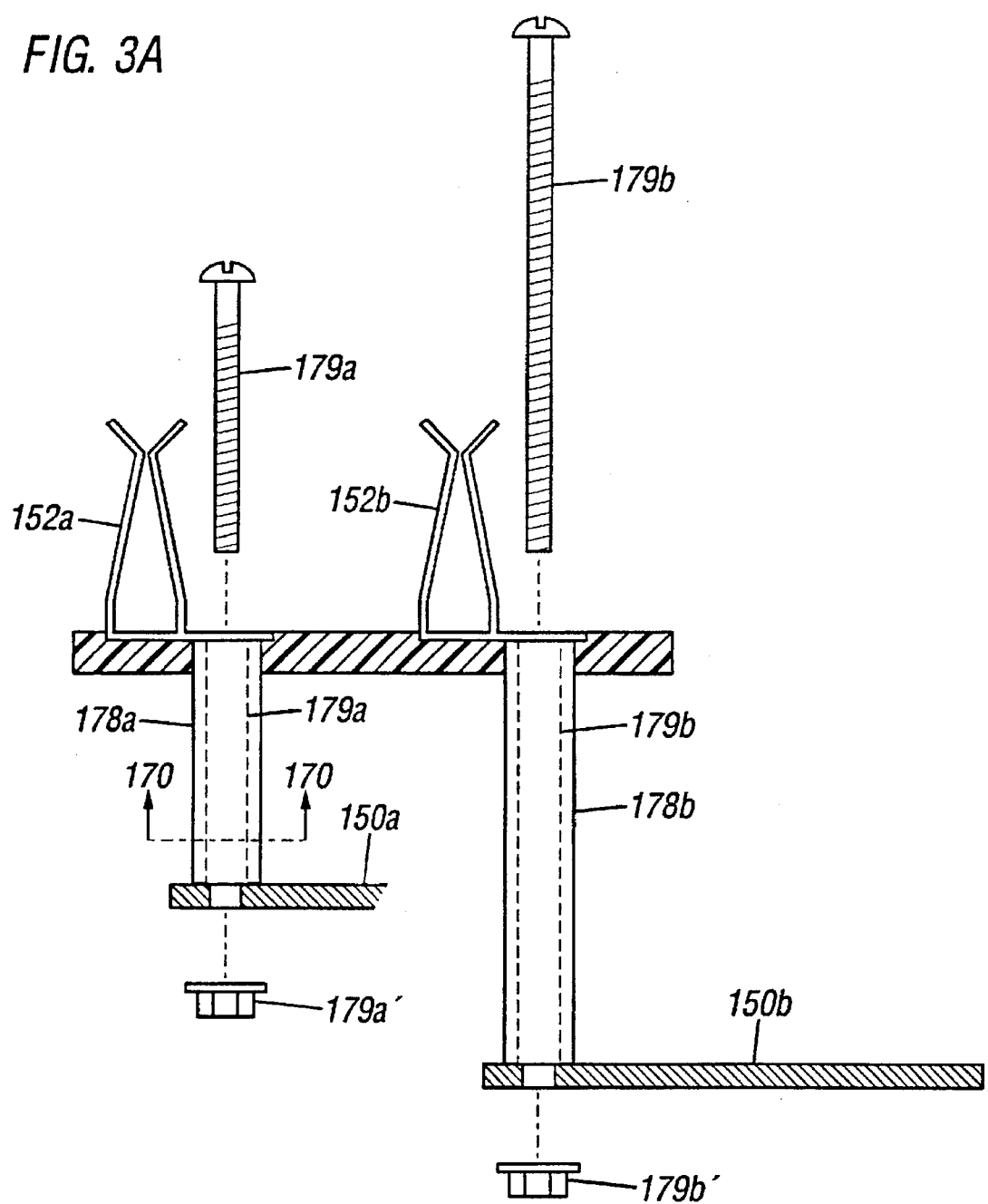
FIG. 3a shows one embodiment of connecting tubular conductor(s) to straight sections of the bus bars according to the present invention.
Figure 3B:
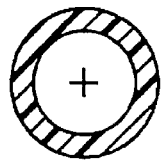

FIG. 3a is an elevational view showing the manner of connecting the tubular buses 178a and 178b to the respective planar (straight) section of their corresponding bus bars 150a and 150b and FIG. 3b shows the cross-section of the tubular bus 178a taken along the axis 170—170 shown in FIG. 3a. The tubular bus 178a is mechanically secured between the meter socket jaw assembly 152a and bus bar 150a by means of a bolt 179a passing through the entire length of the tubular bus 178a in a manner that ensures that the tubular bus 178a makes a good electrical contact with the meter input jaw assembly 152a. Bus bar 150b and meter input jaw assembly 152b are similarly connected to the tubular bus 178b by a nut 179b' and a bolt 179b.

Figure 4A:
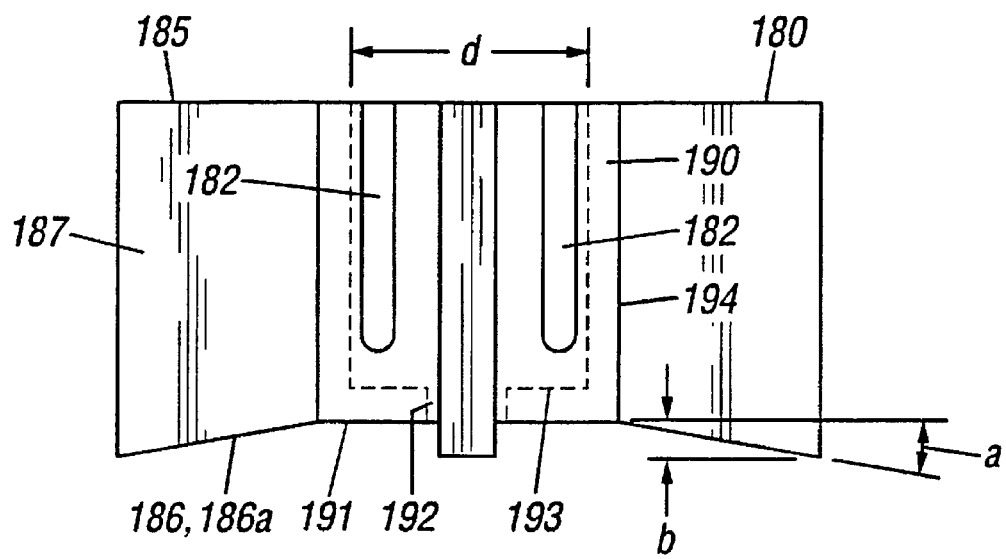
FIG. 4a shows a side view of a contact boot for placement between the bus bar and the tubular bus.
Figure 4B:
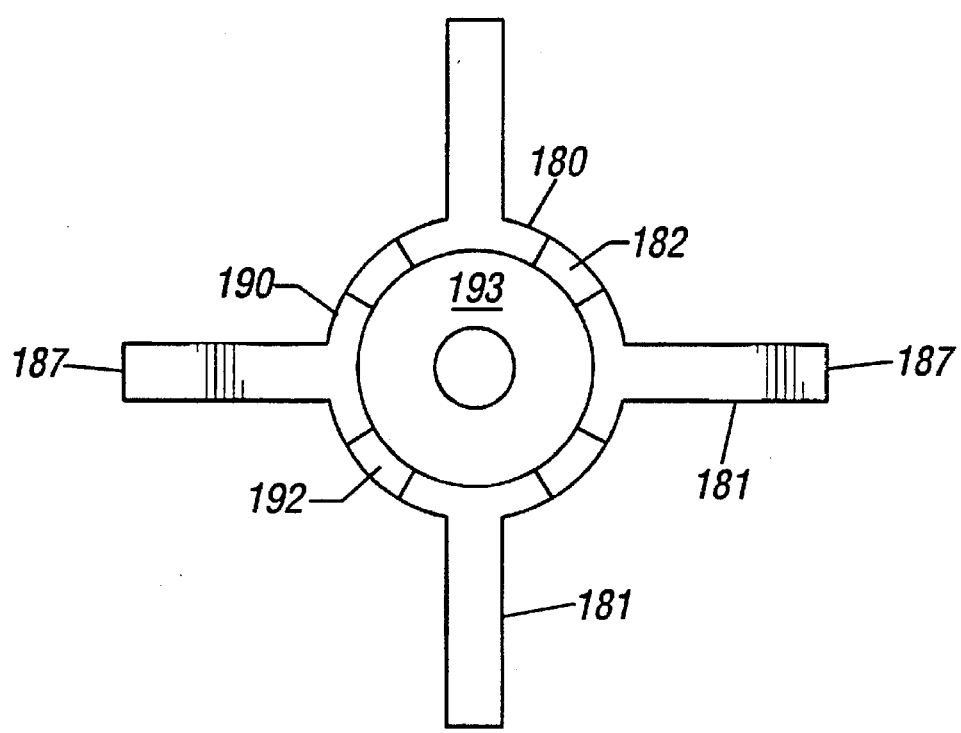

FIG. 4a shows a side view of a novel contact boot 180 for providing improved electrical connection between the tubular bus so as to improve power conduction from the bus bar to the tubular bus. FIG. 4b shows the top view of the contact boot shown in FIG. 5a. Referring to FIGS. 4a and 4b, the contact boot 180 has a tubular section or body 190 and a bottom section 191 having a concentric opening 192 through which bolts, such as a bolt 179a, can pass. A plurality of spaced fins 181 extend away from the tubular section 190 preferably at substantially equal angular spacing from each other. Each fin 181, having an upper end 185, a lower end 186 with bottom surface 186a, and a side 187, extends away from the outer surface 194 of the tubular section 190. The lower end 186 of each fin makes an acute angle "a" with respect to a planar surface to form an offset "b". Axial slots 182 are cut through partial length of the tubular section 190 of the contact boot 180 at substantially equal angular spacing between fins 181. The inside diameter "d" of the tubular section 190 is made such that an end of the tubular bus can slide into the tubular section 190 and seat on the base 193. The contact boot and the tubular bus may be made from any suitable conductive material such as copper or aluminum. The use of the contact boot 180 with the tubular bus will now be described.

Figure 5A:
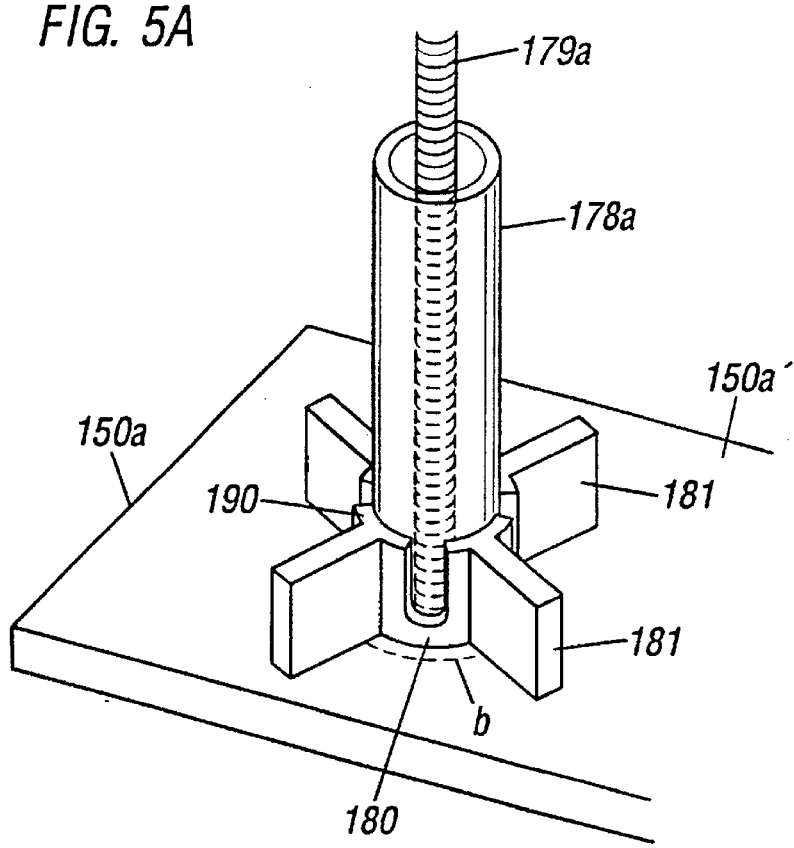
FIG. 5a is a partial isometric view showing the placement (disengaged position) of the contact boot of FIGS. 4a and 4b between the bus bar and the tubular bus.
Figure 5B:
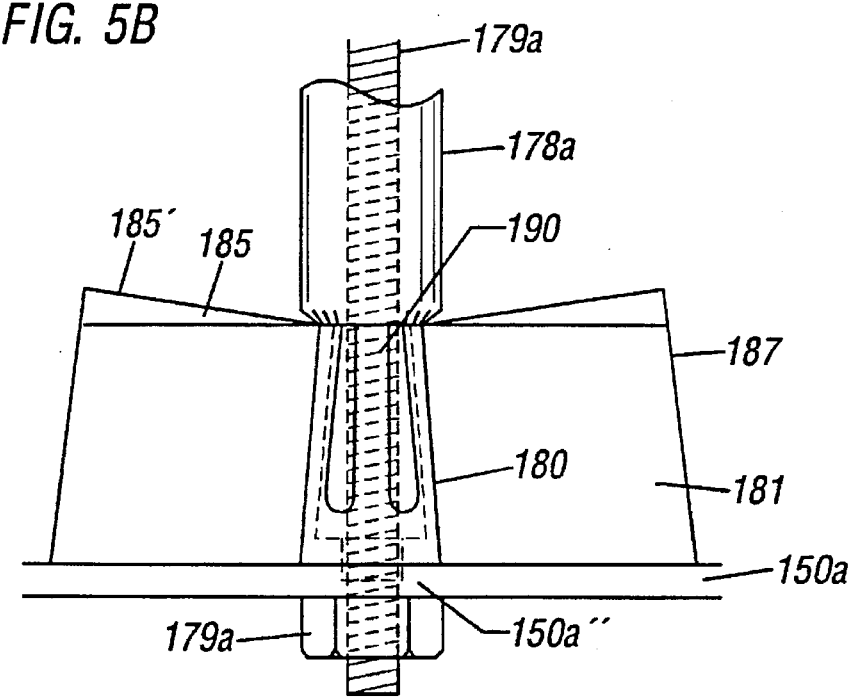

FIG. 5a is a partial isometric view showing the placement of the contact boot 180 placed between the planar surface 150a' of the bus bar 150a and the tubular bus 178a. FIG. 5b shows a side view of the contact boot 180 in the fully engaged position between the planar surface of the bus bar and the tubular bus 178a. Referring to FIGS. 5a and 5b, the contact boot 180 is placed on the bus bar 150a with its bottom surface 186a facing the bus bar 150a. An end of the tubular bus 178a is inserted inside the tubular section 190 until it seats on the base 193 (see FIG. 4a) of the contact boot 180. The bolt 179a is then inserted through the hole 192, an opening 150a" in the bus bar 150a, the tubular bus 178a and an opening in the meter socket base 127. The bolt 179a is then mechanically secured with the nut 179a'. In this manner the tubular bus 178a is secured between the bus bar 150a and the meter jaw assembly by means of a bolt 179a passing through the entire length of the tubular bus 178a and the contact boot 180 which ensures that the tubular bus 178a makes the desired electrical contact with the meter input jaw assembly 152a. As the nut 179a ' is tightened, the stress along the axis of the bolt 179a increases, which causes the bottom of the fins 181 to flatten, thereby decreasing and eventually eliminating the offset "b", which in turn urges the tubular body 190 to securely clamp around the tubular bus 178a and provide a improved electrical contact between the tubular bus 178a and the bus bar 150a. The bus bar 150b and meter input jaw assembly 152b are similarly connected by their associated tubular bus 178b and the contact boot 180 using a nut-bolt assembly 179b.

Figure 6:
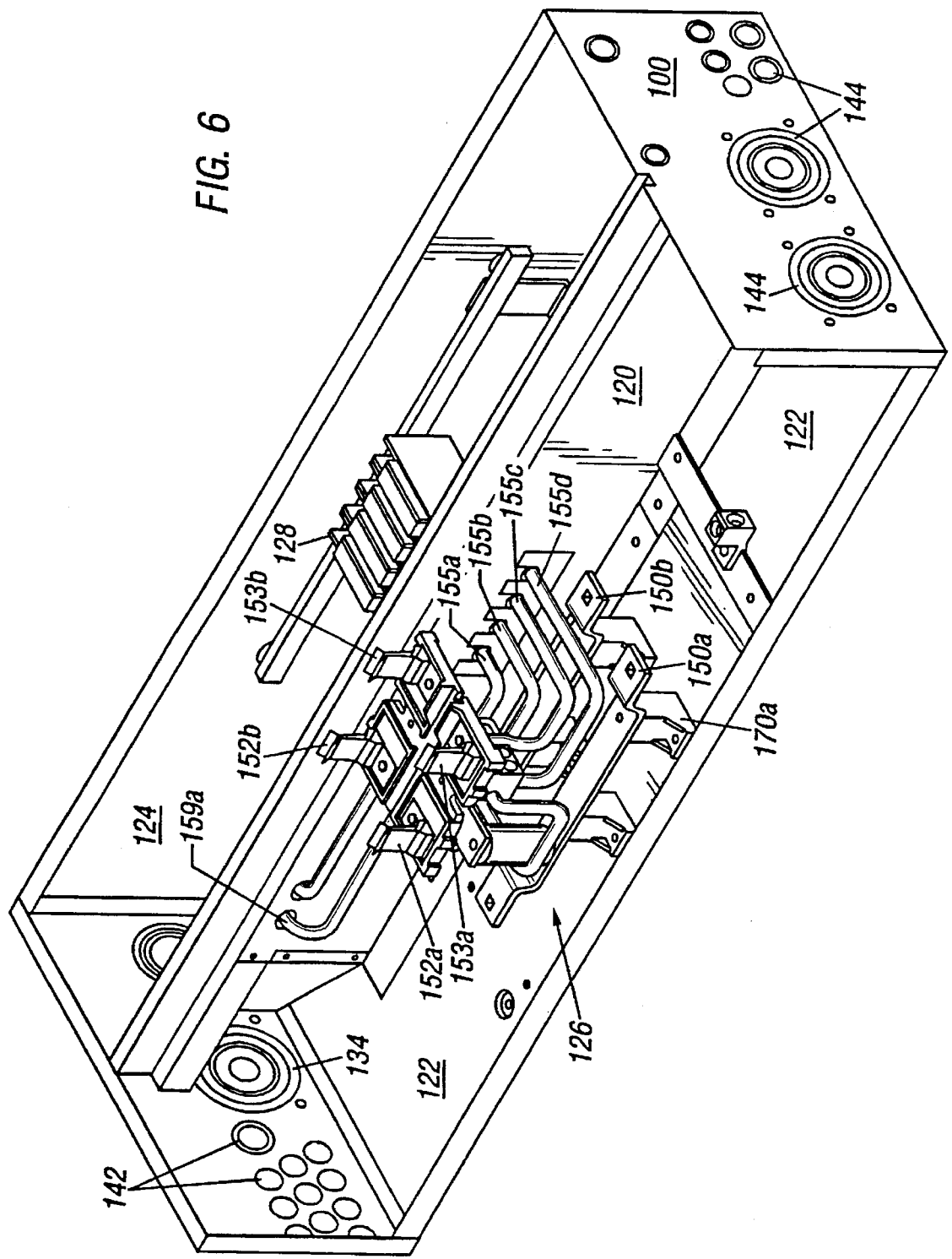
FIG. 6 shows an isometric view of the utility side of a combination service entrance device utilizing the tubular bus for transporting electrical power from a straight bus bar to the meter socket according to present invention.

FIG. 6 shows an isometric view of the utility side 122 of a combination service entrance device having a meter socket arrangement that utilizes tubular buses for transporting electrical power from a straight source bus bar to the meter socket. Now referring to FIGS. 2–6, the utility section 122 contains a meter socket 126 having at least a pair of bus bars 150a and 150b respectively coupled by means of tubular conductors 178a and 178b to corresponding input jaw assemblies 152a and 152b attached to a nonconductive meter socket base 127. The tubular conductors 178a and 178b are secured between bus bars 150a and 150b respectively and their corresponding input jaw assemblies 152a and 152b by means of nut bolt assemblies 179a and 179b as shown in FIG. 3A. Similarly, the tubular conductors 178a and 178b may be secured in described positions by alternate means comprising of a nut bolt assembly 179a and 179b and contact boots 180 as shown in FIG. 5. A separate output jaw assembly corresponding to each input jaw assembly is coupled to the meter base. Output jaw assemblies 152c and 152d respectively correspond to the input jaw assemblies 152a and 152b. The utility lines (not shown) are coupled to the bus bars 150a and 150b for providing main power to the bus bars. Input terminals of a utility meter (not shown) are securely placed in the input jaw assemblies 152a and 152b, while the output terminals of the utility meter are placed in the output jaw assemblies 153a and 153b. The output jaw assemblies are coupled to the service disconnect 128 placed in the customer compartment 124 by means of cables 155a-d.

Thus, the system of the present invention includes a meter socket arrangement wherein the source bus bars are electrically coupled to their corresponding input meter sockets. A contact boot may be coupled to the source bus bar and the tubular bus for providing improved electrical connection between the source bus bar and the tubular bus.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A utility meter socket arrangement, comprising:
   (a) a bus bar;
   (b) a meter socket jaw; and
   (c) a tubular bus for transporting electrical power from the bus bar to the meter socket jaw.

2. A utility meter socket arrangement, comprising:
   (a) a bus bar;
   (b) a meter socket jaw;
   (c) a tubular bus coupled between the bus bar and the meter jaw for transporting electrical power from the bus bar to the meter socket jaw; and
   (d) a contact boot coupled to the bus bar and the tubular bus for facilitating the transportation of electric power from the bus bar to the tubular bus.

3. The apparatus as specified in claim 1, wherein the bus bar has a substantially planar surface to which the tubular bus is coupled.

4. The apparatus as specified in claim 1, wherein the tubular bus is coupled to the bus bar and the meter socket jaw by a bolt placed through an axial opening in the tubular bus.

5. The apparatus as specified in claim 2, wherein the bus bar has a substantially planar surface to which the contact boot is coupled.

6. The apparatus as specified in claim 5, wherein the contact boot has a substantially cylindrical body for receiving therein an end of the tubular bus.

7. The apparatus as specified in claim 5, wherein the boot has a plurality of fins extending away from the body at an angle that enables the body to urge against the tubular bus when the tubular bus is secured between the bus bar and the meter socket jaw.

8. The apparatus as specified in claim 2, wherein an end of the tubular bus is in contact with a first surface area of the contact boot and a second surface area of the contact boot is in contact with the bus bar.

9. The apparatus as specified in claim 8, wherein the second surface area is substantially greater than the first surface area.

10. The apparatus as specified in claim 2, wherein:
    (a) the tubular bus has a through axial opening; and
    (b) the tubular bus is coupled to the bus bar and the meter jaw assembly by bolt passing through the axial opening.

11. The apparatus as specified in claim 2, wherein the boot has substantially planar base that is placed between the bus bar and the tubular bar.

12. The apparatus as specified in claim 11, wherein the base has a substantially greater surface area than the contact surface between the boot and the tubular bus.

13. An electrical power distribution device, comprising:
    (a) a common enclosure having a first section and a second section;
    (b) a meter socket arrangement placed in the first section, said meter socket arrangement having:
        (i) a bus bar,
        (ii) a meter socket jaw, and
        (iii) a tubular bus coupled between the meter socket jaw and the bus bar for transporting electrical power from the bus bar to the meter socket jaw,
    (c) a contact boot coupled to the bus bar and the tubular bus for facilitating transportation of electric power from the bus bar to the tubular bus, and
    (d) a plurality of circuit breakers placed in the second section for receiving power from the meter socket arrangement.

14. The apparatus as specified in claim 13, wherein the bus bar has a planar surface to which the contact boot is coupled.

15. The apparatus as specified in claim 14, wherein the contact boot has a substantially cylindrical body for receiving therein an end of the tubular bus, the body having a first open end and second end having an opening that is smaller than the outside dimensions of the tubular bus.

16. The apparatus as specified in claim 15, wherein the second end has a substantially planar surface.

17. The apparatus as specified in claim 16, wherein the boot has a plurality of fins extending away from the body at an angle that enables the body to urge against the tubular bus when the tubular bus is secured between the bus bar and the meter socket jaw.

18. The apparatus as specified in claim 12, wherein:
    (a) the tubular bus has a through axial opening; and
    (b) the tubular bus is coupled to the bus bar and the meter jaw assembly by a bolt passing through the axial opening.

19. The apparatus as specified in claim 12, wherein the boot has substantially planar base that is placed between the bus bar and the tubular bar, said base having a substantially greater surface area than the contact surface between the boot and the tubular bus.

* * * * *